June 17, 1952　　　　　S. MIRON　　　　　2,600,671
HYDROFLUORIC ACID REFINING OF HYDROCARBON OILS
Filed Oct. 18, 1949
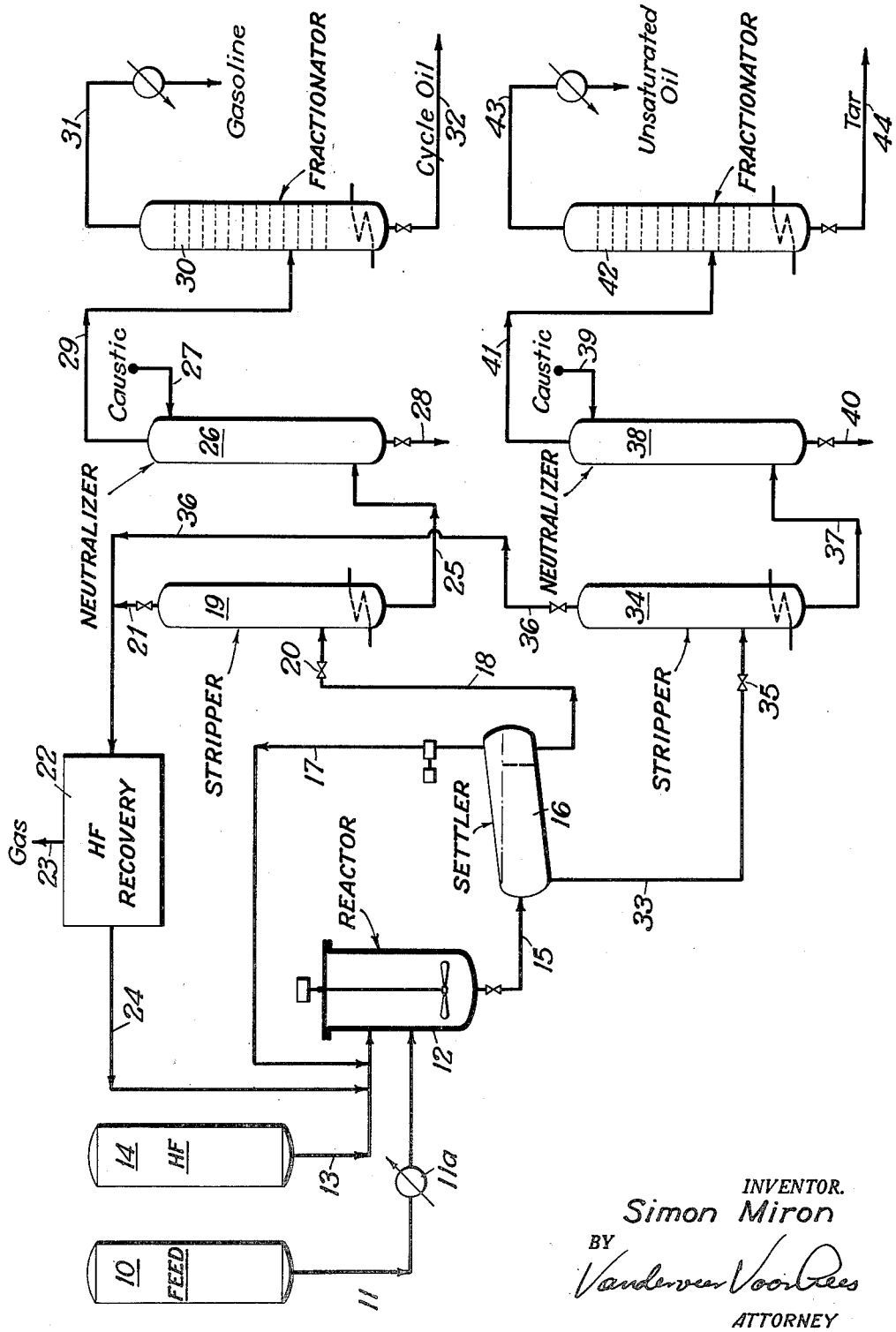
INVENTOR.
Simon Miron
BY
Vanderveer Voorhees
ATTORNEY Patented June 17, 1952

2,600,671

UNITED STATES PATENT OFFICE 2,600,671

HYDROFLUORIC ACID REFINING OF HYDROCARBON OILS

Simon Miron, Galveston, Tex., assignor to Pan American Refining Corporation, Texas City, Tex., a corporation of Delaware Application October 18, 1949, Serial No. 122,011

5 Claims. (Cl. 196—13)

This invention relates to a process of refining hydrocarbon oils, particularly petroleum oils, wherein mixtures of hydrocarbons of various types and molecular weights are present. More specifically the process relates to the separation of such hydrocarbon oil mixtures with hydrofluoric acid. The invention is also concerned with a combination of hydrocarbon conversion employing HF as a catalyst and separation of the converted products.

The invention is illustrated by a drawing which shows diagrammatically the steps of the process as applied to the combination with HF conversion or cracking.

In the conversion of hydrocarbon oils with HF, it has heretofore been the practice to contact the oils, for example gas oil, with liquid HF under pressure and at a temperature of about 250 to 325° F. The amount of HF required for this operation is ordinarily about one-half to one volume per volume of oil treated. The hot products from the reactor have customarily been separated into two phases, an oil phase and an HF phase, the oil containing most of the gasoline produced in the operation while the HF phase contained a tar which could be separated by evaporation of the HF, the HF being recycled to the cracking reactor.

I have now discovered that if the separation of the reaction products is conducted at a controlled elevated temperature near the critical temperature of HF, approximately within a range of 375 to 450° F., the reaction products from the HF conversion of gas oil may be separated into three phases, an upper HF phase, a middle hydrocarbon phase, and a lower tar phase. I have also devised a process by which the tar phase can be eliminated from the process at very slight expense for HF recovery therefrom. The upper HF phase can be recycled directly to the HF conversion state of the process without the necessity of any separation of oil whatever, and the intermediate oil phase can be processed to recover the relatively small amount of HF dissolved therein for recycling.

One method of applying my invention to the conversion of heavy hydrocarbon oils into gasoline and other products will be made clear by referring to the drawing.

A suitable hydrocarbon feed stock from 10 is conducted by line 11 through heater 11a to reactor 12 containing an HF catalyst introduced by line 13 from supply 14. Hydrocarbon stock for the process may be a gas oil or other heavy oil boiling above the boiling range of gasoline which it is desired to convert into gasoline and other products. Straight-run West Texas gas oil having a high sulfur content is a satisfactory stock for the process and the conversion with HF simultaneously reduces the sulfur content by conversion to $H_2S$. Heavy residual oils can also be treated in the process.

The amount of HF catalyst required for the process is suitably within the range of 0.1 to 2.5 parts by weight based on the hydrocarbon feed, the preferred catalyst-to-oil ratio being about 0.5 to 1. Reaction temperature is maintained at about 375 to 450° F., preferably 400 to 420° F. The time of reaction is suitably about 1 to 20 minutes. With some stocks a reaction time of one-half hour to one hour may be desired.

From reactor 12 the reaction products are conducted by line 15 to settler 16 where a settling time of the order of 5 to 30 minutes is provided. In settler 16 the temperature is maintained at about 400° F., usually merely by providing sufficient heat insulation to prevent excessive cooling. If desired, the conversion reaction in reactor 12 may be conducted at a lower temperature, say 300 to 350° F., and the products may be heated before introducing them into the settler 16. It is essential for proper separation of the products to maintain the temperature in settler 16 above about 375° F. and preferably in the range of 400 to 450° F.

The pressure employed in the reactor 12 and settler 16 should be sufficient to maintain the products in the liquid phase and prevent the separation of HF. Pressures of the order of 750 to 2000 p. s. i. are usually required depending partly upon the ratio of HF to oil and partly on the character of the stock treated and the temperature of the operation.

In settler 16 the reaction products are separated into three liquid phases, an HF phase, an oil phase and a tar phase. The HF phase is at the top but the position of the other two phases depends on the temperature and other factors. Generally at temperatures above 385° F. the tar phase is at the bottom. In the drawing, the tar phase is at the bottom.

The HF phase may suitably be recycled by line 17 directly back to reactor 12 without reduction in pressure or without any special treatment. The HF supply to the reactor by this method is almost sufficient to meet the requirement for the conversion operation in the reactor 12 and little additional HF is required to be supplied from 14. Inasmuch as the HF recycled by line 17 is substantially at reaction temperature little additional heat load is placed on the reactor and all the heat required for the process can be readily supplied by the hot oil feed heated in 11a.

The oil phase or middle layer in 16, consisting in major part of saturated hydrocarbons of a wide range of boiling points, including gasoline, is conducted by line 18 to HF stripper 19 where HF is removed by reduction of pressure through valve 20. Dissolved hydrocarbon gas is also withdrawn with the HF vapor and the mixture of vapors is conducted by line 21 to HF recovery zone 22. The HF may be recovered from the gases by conventional means, for example, by cooling and condensing or preferably by selective adsorption in a suitable adsorbent, either solid or liquid. The hydrocarbon feed stock for the process flowing through line 11 may be employed for this purpose, the HF being absorbed in the cold feed while the unabsorbed gases are discharged from the system by line 23. Recovered HF is recycled to the reactor 12 by line 24.

Hydrocarbon oil, largely stripped of HF, is conducted from stripper 19 by line 25 leading to neutralizer 26 where remaining traces of HF are removed by washing with an alkaline solution, for example caustic soda introduced by line 27. Spent wash solution is discharged by line 28. The neutralized oil is conducted by line 29 to fractionator 30 where it is distilled to produce a gasoline fraction as an overhead product in line 31 and a higher boiling fraction withdrawn by line 32, usually called cycle oil. The higher boiling fraction from 32 may be recycled to the reactor 12 for further conversion.

The tar phase from the bottom of settler 16 is conducted by line 33 leading to stripper 34, usually maintained at a lower pressure by reducing pressure at valve 35. HF and hydrocarbon gases are conducted by line 36 to HF recovery zone 22 where they are processed as hereinbefore described to recover HF. The flashed and stripped tar flows by line 37 to neutralizer 38 where it is washed with an alkaline solution, e. g. caustic soda introduced by line 39. Spent wash solution is withdrawn by line 40 and the washed tar passes by line 41 to fractionator or stripper 42 where lighter oils are removed as an overhead product by line 43. This fraction is highly unsaturated and is suitable for use as a drying oil or as a raw material for resin manufacture. The unevaporated residue or tar is withdrawn from line 44 from the bottom of fractionator 42.

The removal of HF from the products in strippers 19 and 34 may be facilitated by introducing additional heat into these strippers to compensate for heat losses from handling and from evaporation. Recovery of HF in strippers 19 and 34 can also be facilitated by passing an inert gas through the hot liquid products therein, the gas acting as a stripping gas and facilitating the removal of HF vapors. Gas for this purpose may be recycled from gas line 23 by means not shown. If a highly unsaturated oil is desired, it can be obtained from the tar phase by washing with water to remove HF, thus avoiding excessive heating and polymerization reactions.

The following data give the results obtained in two runs, in which a naphthenic gas oil was subjected to conversion with anhydrous HF and the conversion products were separated at elevated temperature. The results are shown in the following table:

Table I

| Charge | Run 1 | Run 2 |
|---|---|---|
| Gas Oil, grams | 590 | 590 |
| HF, grams | 300 | 280 |
| Ratio HF to Oil | 0.508 | 0.475 |
| Conversion: | | |
| Time of heating reactants to conversion temperature, minutes | 96 | 130 |
| Time of reaction, minutes | 15 | 10 |
| Average reaction temperature, °C | 198 | 214 |
| Average reaction pressure, p. s. i | 1019 | 1293 |
| Product Separation: | | |
| Time of settling, minutes | 16 | 10 |
| Average settling temperature, °C | 210 | 219 |
| Average settling pressure, p. s. i | 1052 | 1339 |
| Initial sample, grams | | 21 |
| Sample 1, grams | 267 | 180 |
| Sample 2, grams | 253 | 276 |
| Sample 3, grams | 247 | 280 |
| Sample 4, grams | 77 | 90 |
| Sample 5 (Residue in separator, by difference), grams | 46 | 23 |

The samples referred to in the table were withdrawn from the bottom of the settler, but no means were available for making a sharp separation between the different phases. Accordingly, it would be expected that some overlapping or mixing of phases would result, and this indeed was found to be the case when the samples were subsequently analyzed by neutralizing the HF with KOH and inspecting the hydrocarbon products. Analyses are shown in the following tables:

Table II

| Samples from Run 1 | 1 | 2 | 3 | 4 | 5 |
|---|---|---|---|---|---|
| Weight, grams | 267 | 253 | 247 | 77 | [1] 46 |
| Per cent HF | 29.2 | 6.3 | 43.1 | 79.5 | 63.7 |
| Per cent Liquid Hydrocarbon | 56.2 | 86.6 | 48.8 | 9.5 | 0.0 |
| Per cent Tar | 10.5 | 1.6 | 0.2 | 0.0 | 0.0 |
| Per cent Gas | 1.2 | 1.2 | 5.0 | 7.0 | 4.1 |
| Total | 97.1 | 95.7 | 97.1 | 96.0 | [2] (67.8) |

[1] Assumed weight of contents, found by difference between the total weight of charge and combined weight of samples 1, 2, 3 and 4.
[2] Low because the assumed weight of sample 5 includes all the losses from 1, 2, 3 and 4.

Table III

| Samples from Run 2 | Initial | 1 | 2 | 3 | 4 | 5 |
|---|---|---|---|---|---|---|
| Weight, grams | 21 | 180 | 276 | 280 | 90 | [1] 23 |
| Per cent HF | 33.8 | 12.6 | 5.8 | 47.3 | 71.9 | 95.0 |
| Per cent Liquid Hydrocarbons | 14.3 | 65.4 | 84.5 | 39.7 | 9.2 | 0.0 |
| Per cent Tar | 44.3 | 11.6 | 3.1 | 0.9 | 0.0 | 0.0 |
| Per cent Hydrocarbon Gas | 0.9 | 0.2 | 0.1 | 4.7 | 6.1 | 6.1 |
| Total | 93.3 | 89.8 | 93.5 | 92.6 | 87.2 | (102.1) |

[1] By difference, from total weight of charge.

An examination of the foregoing data shows that the tar, present in the oil after conversion, was found almost entirely in the first sample drawn from the bottom of the settler. Thus, in run 1 only 4.5 grams of tar were found in samples 2 and 3, while no tar was found in samples 4 and 5. Sample 1 contained 28 grams of tar. In run 2, the initial sample was made small in order to reduce the amount of oil overlapping into the tar. The results show only three grams of oil and 9.3 grams of tar in this sample, with relatively little liquid HF. It is apparent that, with more careful separation and longer time for settling, substantially all the tar could be obtained free from oil in the first fraction removed from the bottom of the settler. In a continuous process, a centrifugal separator could be employed for this purpose with advantage.

Further inspection of the data show that the oil contained in samples 2 was associated with very little dissolved HF. Samples 3 contain about an equal weight of HF and are probably contaminated with HF phase from samples 4. Samples 4 consist largely of HF with relatively little oil dissolved in it, indicating a definite interface between samples 3 and 4.

Analysis of the hydrocarbon in the HF phase of run 1 showed a density at 25° C. of 0.7717, a refractive index of 1.4315 ($n_D^{25}$), a bromine number of 0.5, and a distillation range of about 275 to 450° F. The oil from the HF phase of run 2 was similar in characteristics viz., density at 25° C. 0.7911; refractive index ($n_D^{25}$) 1.4434, and a boiling range approximately 200 to 550° F. These oils were of a light straw color and entirely free from tar.

Gasoline and cycle oil were separated from the middle or hydrocarbon phase and had the following properties:

Table IV

|  | Gasoline | Cycle Oil |
|---|---|---|
| Gravity—A. P. I. | 49.9 | 32.9 |
| Spec. Grav. 60/60° F. | 0.7800 | 0.8607 |
| Refractive Index $n_D^{25}$ | 1.4320 | 1.4740 |
| Specific Dispersion, 25° C. | 114.1 | 113.7 |
| Bromine Number | 0.3 | 0.2 |
| Wt. Per cent Sulfonated | 25.3 | 18.7 |
| Aniline Point, °C. | 39.2 | 67.5 |

The tar fraction, after washing out HF, had an A. P. I. gravity of 10.9, molecular weight of 275 and an iodine number of 92.

It will be clear from the foregoing that anhydrous liquid HF is an excellent medium for separating tar from hydrocabon oils contaminated therewith. In order to obtain the desired separation of tar substantially free of oil, it is necessary to operate at a temperature near the critical temperature of HF, which is approximately 450° F. I have found that in the case of most oils contaminated with tar, the tar cannot be separated at temperatures much below 400° F. and, in general, no tar separation is obtained below 375° F. The optimum separation temperature depends on the amount of tar present in the oil and the character of the oil.

My process may be applied to the separation of tar from various kinds of tar-containing oils, such as the residual oils or cycle oils from cracking processes, particularly thermal or non-catalytic processes, and the residual oils from crude distillation.

Having thus described my invention what I claim is:

1. The process of separating tar-containing mineral oils which comprises intimately contacting said oils with at least about one-tenth part, by weight, of liquid HF at a temperature of 375 to 450° F. and under sufficient pressure to maintain the HF in liquid condition, separating the resulting mixture while at said temperature by differences in density into three phases, a tar phase, an oil phase, and a lighter HF phase, separately withdrawing each of said phases and removing HF from said tar phase and said oil phase.

2. The process of claim 1 wherein the ratio of HF to oil is about 0.5 to 2.5 by weight.

3. The process of claim 1 wherein said contacting step is conducted in a continuous manner and the HF phase withdrawn from said separation step is recycled directly to said contacting step for treating additional tar-containing oil.

4. The method of refining hydrocarbon oils with liquid hydrofluoric acid, which comprises contacting a heavy hydrocarbon oil boiling above the boiling range of gasoline with anhydrous liquid HF in the ratio of about 0.5 to 2.5, maintaining the mixture at a conversion temperature above about 300° F. and a pressure sufficient to prevent vaporization of HF, thereby effecting conversion of said heavy oil into gasoline and other products, including tar, settling said reaction products and HF at a temperature in the range of about 375 to 450° F. thereby effecting stratification into three layers, a lower tar phase, an intermediate oil phase, and an upper HF phase, separately withdrawing each of said phases, removing HF from said tar phase and said oil phase, and recovering gasoline from said oil phase.

5. The process of claim 4 wherein said HF phase is recycled directly to the conversion step of the process.

SIMON MIRON.

REFERENCES CITED

The following references are of record in the file of this patent:

UNITED STATES PATENTS

| Number | Name | Date |
|---|---|---|
| 2,378,762 | Frey | June 19, 1945 |
| 2,438,565 | Linn et al. | Mar. 30, 1948 |
| 2,454,615 | Ridgway et al. | Nov. 23, 1948 |
| 2,475,147 | Manley | July 5, 1949 |